(12) United States Patent
Ibata et al.

(10) Patent No.: US 8,174,819 B2
(45) Date of Patent: May 8, 2012

(54) SOLID ELECTROLYTIC CAPACITOR

(75) Inventors: Yasuko Ibata, Osaka (JP); Hiroya Nishimoto, Higashiosaka (JP); Takeshi Takamatsu, Daito (JP)

(73) Assignee: SANYO Electric Co., Ltd., Moriguchi, Osaka (JP)

( * ) Notice: Subject to any disclaimer, the term of this patent is extended or adjusted under 35 U.S.C. 154(b) by 233 days.

(21) Appl. No.: 12/728,798

(22) Filed: Mar. 22, 2010

(65) Prior Publication Data

US 2010/0238609 A1    Sep. 23, 2010

(30) Foreign Application Priority Data

Mar. 23, 2009 (JP) ................. 2009-069510

(51) Int. Cl.
*H01G 9/04* (2006.01)
(52) U.S. Cl. ........ 361/528; 361/523; 361/525; 361/529; 361/516; 361/519; 29/25.01; 29/25.03
(58) Field of Classification Search .................. 361/528, 361/516–519, 523–525, 529–530, 540–541, 361/509–512; 29/25.01, 25.03
See application file for complete search history.

(56) References Cited

U.S. PATENT DOCUMENTS

| | | | | |
|---|---|---|---|---|
| 6,229,687 B1 * | 5/2001 | Wada et al. | ................ | 361/523 |
| 6,411,498 B2 * | 6/2002 | Nakamura | ................ | 361/523 |
| 6,552,896 B1 * | 4/2003 | Igaki et al. | ................ | 361/523 |
| 6,850,406 B2 * | 2/2005 | Asami et al. | ................ | 361/528 |
| 6,876,083 B2 * | 4/2005 | Yano et al. | ................ | 257/764 |
| 7,123,468 B2 * | 10/2006 | Kawashima et al. | ........ | 361/532 |
| 7,940,515 B2 * | 5/2011 | Ozawa | ................ | 361/523 |

FOREIGN PATENT DOCUMENTS

JP    2002-134359 A    5/2002

* cited by examiner

*Primary Examiner* — Nguyen T Ha
(74) *Attorney, Agent, or Firm* — Westerman, Hattori, Daniels & Adrian, LLP

(57) ABSTRACT

A solid electrolytic capacitor comprises an insulating substrate in which an anode terminal and a cathode terminal are formed. The anode terminal comprises a first anode section formed on a first surface of the insulating substrate, and a second anode section formed on a second surface of the insulating substrate, which are electrically connected to each other. A connection part is formed integrally with the first anode section. The cathode terminal comprises a first cathode section formed on the first surface and a second cathode section formed on the second surface, which are electrically connected to each other. A distance between the first anode section and the first cathode section is smaller than a distance between the second anode section and the second cathode section. And an anode section and a cathode section of a capacitor element are electrically connected to the connection part and the first cathode section respectively.

5 Claims, 9 Drawing Sheets

SOLID ELECTROLYTIC CAPACITOR

The application Number 2009-069510, upon which this patent application is based, is hereby incorporated by reference.

BACKGROUND OF THE INVENTION

1. Field of the Invention

The present invention relates to a solid electrolytic capacitor formed by mounting a capacitor element on an insulating substrate.

2. Description of Related Art

In a conventional solid electrolytic capacitor, as shown in FIG. 12, a capacitor element 101 is coated with an enclosure resin 102. Inside the enclosure resin 102, one end part 103a of an anode terminal 103 is connected to an anode section 101a of the capacitor element 101, while one end part 104a of a cathode terminal 104 is connected to a cathode section 101b of the capacitor element 101. Both the anode terminal 103 and the cathode terminal 104 are drawn out from the enclosure resin 102, and are bent along an outer peripheral surface of the enclosure resin 102 so that the other end parts 103b, 104b of the terminals 103, 104 are located along a lower surface 102a of the enclosure resin 102. The end parts 103b, 104b of both the terminals 103, 104 located along the lower surface 102a of the enclosure resin 102 form lower surface electrodes of the solid electrolytic capacitor.

In a manufacturing process of the solid electrolytic capacitor described above, required is a complicated step of bending the anode terminal 103 and the cathode terminal 104. In addition, since the enclosure resin 102 of appropriate thickness needs to be interposed between a lower surface of the capacitor element 101 and the lower surface electrodes, there has been a problem of lower occupancy of the capacitor element 101 in the solid electrolytic capacitor, or a problem of greater equivalent series resistance (ESR) or equivalent series inductance (ESL) due to an increase in lengths of the anode terminal 103 and the cathode terminal 104.

Therefore, as shown in FIG. 13, it has been proposed to form the solid electrolytic capacitor by mounting the capacitor element 101 on an insulating substrate 107 (e.g., a printed board) in which an anode terminal 105 and a cathode terminal 106 are formed. In this solid electrolytic capacitor, the anode terminal 105 comprises: a first anode section 105a formed on an upper surface 107a of the insulating substrate 107; a second anode section 105b formed on a lower surface 107b of the insulating substrate 107; and an anode via 105c opening in the insulating substrate 107 to electrically connect the first anode section 105a and the second anode section 105b to each other. The cathode terminal 106 comprises: a first cathode section 106a formed on the upper surface 107a of the insulating substrate 107; a second cathode section 106b formed on the lower surface 107b of the insulating substrate 107; and a cathode via 106c opening in the insulating substrate 107 to electrically connect the first cathode section 106a and the second cathode section 106b to each other.

In the solid electrolytic capacitor described above, to the first anode section 105a, electrically connected is the anode section 101a of the capacitor element 101 through a pad member 108, while, to the first cathode section 106a, electrically connected is the cathode section 101b of the capacitor element 101 by a conductive adhesive. The second anode section 105b and the second cathode section 106b form the lower surface electrodes of the solid electrolytic capacitor.

Thus, by using the insulating substrate 107 to form the solid electrolytic capacitor, a distance from the lower surface of the capacitor element 101 to the lower surface electrodes decreases. Therefore, lengths of the anode terminal 105 and the cathode terminal 106 decrease, resulting in reducing the ESR or ESL. Moreover, due to the employment of the insulating substrate 107 in which the anode terminal 105 and the cathode terminal 106 are formed, it is not necessary to execute the complicated step of bending the anode terminal and the cathode terminal required in the manufacturing process of the solid electrolytic capacitor shown in FIG. 12.

However, in the solid electrolytic capacitor shown in FIG. 13, since the anode section 101a of the capacitor element 101 and the anode terminal 105 are connected to each other by the pad member 108, required is a complicated step of installing the pad member 108 on the anode terminal 105 in the manufacturing process. In addition, the ESR or ESL might increase significantly due to poor connection or the like which occurs between the pad member 108 and the anode terminal 105.

SUMMARY OF THE INVENTION

In view of above described problems, an object of the present invention is to provide a solid electrolytic capacitor which is easily-manufactured, and in which the ESR or ESL is reduced.

A first solid electrolytic capacitor according to the present invention comprises: a capacitor element including an anode section, a cathode section, and a dielectric layer; and an insulating substrate in which an anode terminal and a cathode terminal are formed. The capacitor element is mounted on the insulating substrate. Here, the anode terminal comprises a first anode section formed on a first surface of the insulating substrate on which the capacitor element is mounted, and a second anode section formed on a second surface of the insulating substrate located on an opposite side to the first surface, which are electrically connected to each other. A connection part configured to electrically connect the first anode section and the anode section of the capacitor element to each other is formed integrally with the first anode section. The cathode terminal comprises a first cathode section formed on the first surface of the insulating substrate and a second cathode section formed on the second surface of the insulating substrate, which are electrically connected to each other. A distance between the first anode section and the first cathode section is smaller than a distance between the second anode section and the second cathode section. And the anode section and the cathode section of the capacitor element are electrically connected to the connection part and the first cathode section respectively.

According to the first solid electrolytic capacitor described above, since the connection part is formed integrally with the first anode section of the anode terminal, it is not necessary to execute a complicated step required in the manufacturing process of the conventional solid electrolytic capacitor in which the connection part and the first anode section are formed as separate members, namely a complicated step of installing the connection part on the first anode section before mounting the capacitor element on the insulating substrate.

Further, in the solid electrolytic capacitor described above, the connection condition between the connection part and the first anode section is better than in the conventional solid electrolytic capacitor in which the connection part and the first anode section are formed as separate members, and the ESR or ESL of the solid electrolytic capacitor is reduced.

Furthermore, in the solid electrolytic capacitor described above, since the distance between the first anode section and the first cathode section is smaller than the distance between the second anode section and the second cathode section, the area of the first cathode section can be increased. Therefore, the connection area between the first cathode section and the cathode section of the capacitor element can be increased, and as a result, the ESR or ESL of the solid electrolytic capacitor is reduced.

A second solid electrolytic capacitor according to the present invention is the first solid electrolytic capacitor described above, wherein on the first surface of the insulating substrate, an anode section forming area where the first anode section is formed and a cathode section forming area where the first cathode section is formed are included in the same plane.

A third solid electrolytic capacitor according to the present invention is the first or second solid electrolytic capacitor described above, wherein an end of the cathode section of the capacitor element and an end of the first cathode section of the cathode terminal which are located on the first anode section side are generally flush with each other at a position spaced from the first anode section by a predetermined distance.

A fourth solid electrolytic capacitor according to the present invention is any one of the first to third solid electrolytic capacitors described above, wherein the capacitor element includes an anode body from which an anode lead is drawn out, the dielectric layer is formed on an outer peripheral surface of the anode body, a cathode layer is formed on an electrolyte layer which is formed on the dielectric layer, the anode lead and the cathode layer form the anode section and the cathode section of the capacitor element respectively, the connection part projects on the first anode section, and the anode section of the capacitor element is connected to an end of the connection part.

A fifth solid electrolytic capacitor according to the present invention is any one of the first to third solid electrolytic capacitors described above, wherein the capacitor element includes a foil-like anode body, the dielectric layer is formed on a part of an outer peripheral surface of the anode body, a cathode layer is formed on an electrolyte layer which is formed on the dielectric layer, a part of the outer peripheral surface of the anode body which is exposed from the dielectric layer and the cathode layer form the anode section and the cathode section of the capacitor element respectively, and the connection part is formed by a part of the outer peripheral surface of the first anode section.

DETAILED DESCRIPTION OF THE PREFERRED EMBODIMENT

A preferred embodiment of the present invention is described in detail below with reference to the drawings.

Figure 1:
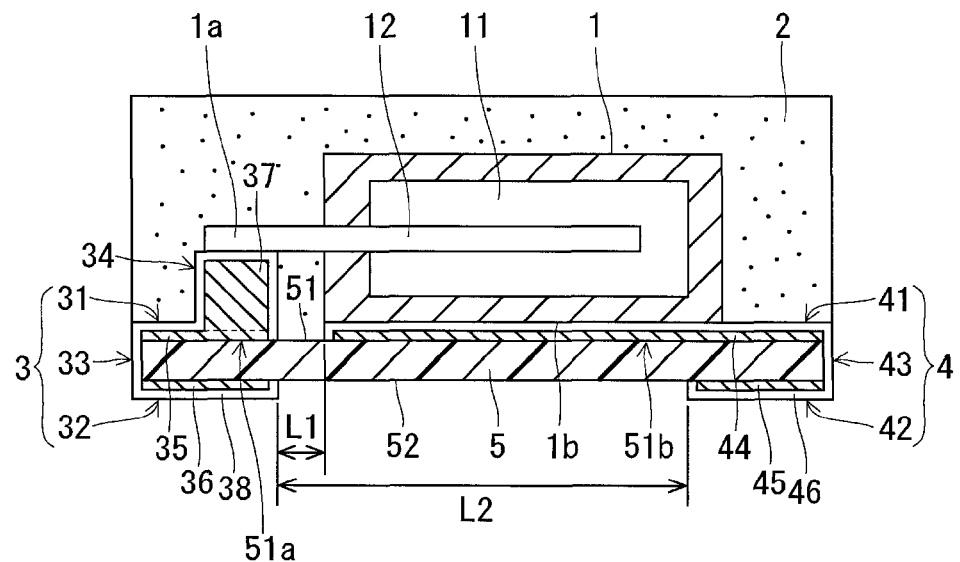
FIG. 1 is a cross-sectional view of a solid electrolytic capacitor according to one embodiment of the present invention.

As shown in FIG. 1, a solid electrolytic capacitor according to the embodiment of the present invention is formed by mounting a capacitor element 1 on an insulating substrate 5 and coating the capacitor element 1 with an enclosure resin 2.

Figure 2:
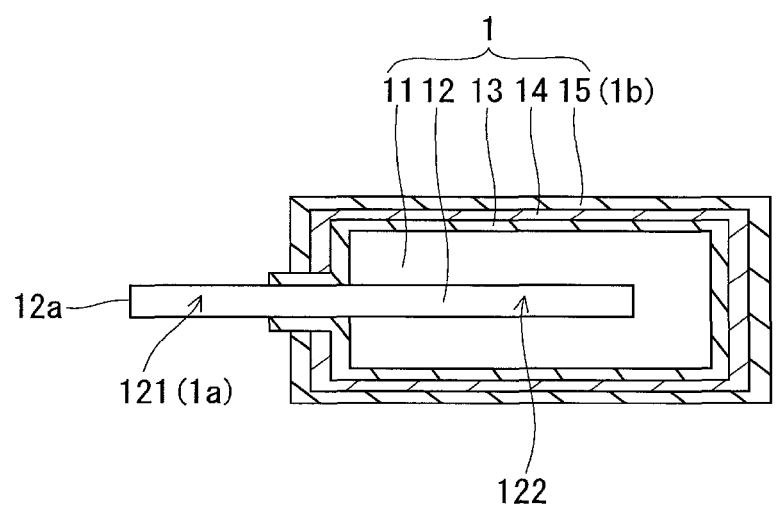
FIG. 2 is a cross-sectional view of a capacitor element included in the solid electrolytic capacitor.

As shown in FIG. 2, the capacitor element 1 comprises an anode body 11 from which an anode lead 12 is drawn out, a dielectric layer 13 formed on an outer peripheral surface of the anode body 11, an electrolyte layer 14 formed on the dielectric layer 13, and a cathode layer 15 formed on the electrolyte layer 14.

The anode body 11 is formed by a porous sintered body made of a valve metal. As the valve metal, used is, for example, tantalum, niobium, titanium, aluminum or the like.

The anode lead 12 comprises a part 121 which includes one end part 12a and projects from the outer peripheral surface of the anode body 11, and a remaining part 122 buried in the anode body 11. The anode lead 12 is formed of a valve metal of the same kind as or different kind from the valve metal forming the anode body 11, and the anode body 11 and the anode lead 12 are electrically connected to each other.

The dielectric layer 13 is formed by an oxide film formed on the outer peripheral surface of the anode body 11, and the oxide film is formed by immersing the anode body 11 in an electrolytic solution such as phosphate aqueous solution, adipic acid aqueous solution or the like to oxidize the outer peripheral surface of the anode body 11 electrochemically (anodic oxidation).

The electrolyte layer 14 is formed of an electrically-conductive inorganic material such as manganese dioxide or the like, or an electrically-conductive organic material such as TCNQ (Tetracyano-quinodimethane) complex salt, electrically-conductive polymer or the like, and formed on the dielectric layer 13.

The cathode layer 15 is formed by a carbon layer formed on the electrolyte layer 14 and a silver paste layer formed on the carbon layer, and the electrolyte layer 14 and the cathode layer 15 are electrically connected to each other.

In the capacitor element 1 described above, the part 121 of the anode lead 12 which is drawn out from the anode body 11 forms an anode section 1a of the capacitor element 1, while the cathode layer 15 forms a cathode section 1b of the capacitor element 1.

As shown in FIG. 1, the anode terminal 3 and the cathode terminal 4 are formed on the insulating substrate 5.

The anode terminal 3 comprises: a first anode section 31 formed on an upper surface 51 of the insulating substrate 5 on which the capacitor element 1 is to be mounted; a second anode section 32 formed on a lower surface 52 of the insulating substrate 5 located on an opposite side to the upper surface 51; and an anode conductive layer 33 formed on a part of a side edge surface of the insulating substrate 5 to electrically connect the first anode section 31 and the second anode section 32 to each other. The first anode section 31 is coated with the enclosure resin 2, while the second anode section 32 and the anode conductive layer 33 are exposed from the enclosure resin 2.

A connection part 34 for electrically connecting the first anode section 31 and the anode section 1a of the capacitor element 1 to each other is formed integrally with the first anode section 31. In this embodiment, the connection part 34 projects from an upper surface of the first anode section 31. The anode section 1a of the capacitor element 1, namely the anode lead 12, is electrically connected to an end part of the connection part 34 by welding.

Specifically, in the solid electrolytic capacitor according to this embodiment, a first anode forming part 35 is formed on the upper surface 51 of the insulating substrate 5, a second anode forming part 36 is formed on the lower surface of the insulating substrate 5, and a connection forming part 37 projects from an upper surface of the first anode forming part 35. The connection forming part 37 is formed integrally with the first anode forming part 35. A plating layer 38 is formed on: outer peripheral surfaces of the first anode forming part 35 and the connection forming part 37 which are formed integrally with each other; an outer peripheral surface of the second anode forming part 36; and a part of the side edge surface of the insulating substrate 5. Here, copper is used as a material of the first and second anode forming parts 35, 36.

The first anode forming part 35 and a part of the plating layer 38 which is formed on the outer peripheral surface of the first anode forming part 35 form the first anode section 31 of the anode terminal 3. The second anode forming part 36 and a part of the plating layer 38 which is formed on the outer peripheral surface of the second anode forming part 36 form the second anode section 32 of the anode terminal 3. And, a part of the plating layer 38 which is formed on the side edge surface of the insulating substrate 5 forms the anode conductive layer 33 of the anode terminal 3.

Besides, the connection forming part 37 and a part of the plating layer 38 which is formed on the outer peripheral surface of the connection forming part 37 form the connection part 34.

The cathode terminal 4 comprises: a first cathode section 41 formed on the upper surface 51 of the insulating substrate 5; a second cathode section 42 formed on the lower surface 52 of the insulating substrate 5; and a cathode conductive layer 43 formed on a part of a side edge surface of the insulating substrate 5 to electrically connect the first cathode section 41 and the second cathode section 42 to each other. The first cathode section 41 is coated with the enclosure resin 2, while the second cathode section 42 and the cathode conductive layer 43 are exposed from the enclosure resin 2. The cathode section 1b of the capacitor element 1, namely the cathode layer 15, is electrically connected to the first cathode section 41 by a conductive adhesive.

Specifically, in the solid electrolytic capacitor according to this embodiment, a first cathode forming part 44 is formed on the upper surface 51 of the insulating substrate 5, and a second cathode forming part 45 is formed on the lower surface 52 of the insulating substrate 5. A plating layer 46 is formed on outer peripheral surfaces of the first and second cathode forming parts 44, 45 and a part of the side edge surface of the insulating substrate 5. Copper is used as a material of the first and second cathode forming parts 44, 45.

The first cathode forming part 44 and a part of the plating layer 46 which is formed on the outer peripheral surface of the first cathode forming part 44 form the first cathode section 41 of the cathode terminal 4. The second cathode forming part 45 and a part of the plating layer 46 which is formed on the outer peripheral surface of the second cathode forming part 45 form the second cathode section 42 of the cathode terminal 4. And, a part of the plating layer 46 which is formed on the side edge surface of the insulating substrate 5 forms the cathode conductive layer 43 of the cathode terminal 4.

The anode terminal 3 and the cathode terminal 4 are arranged on the upper surface 51 and the lower surface 52 of the insulating substrate 5 so that a distance L1 between the first anode section 31 and the first cathode section 41 is smaller than a distance L2 between the second anode section 32 and the second cathode section 42.

The capacitor element 1 is arranged so that an end of the cathode section 1b of the capacitor element 1 and an end of the first cathode section 41 of the cathode terminal 4 which are both located on the first anode section 31 side are generally flush with each other at a position spaced from the first anode section 31 by the predetermined distance L1.

The enclosure resin 2 coating the capacitor element 1 is formed on the upper surface 51 of the insulating substrate 5 so that the second anode section 32 and the second cathode section 42 are exposed from the enclosure resin 2, and the anode conductive layer 33 and the cathode conductive layer 43 are exposed from the enclosure resin 2. Therefore, in the solid electrolytic capacitor according to this embodiment, the second anode section 32 and the second cathode section 42 form the lower surface electrodes, and, the anode conductive layer 33 and the cathode conductive layer 43 are exposed from side surfaces of the enclosure resin 2.

In this embodiment, the upper surface 51 of the insulating substrate 5 is flat and does not have a step. On the upper surface 51, an anode section forming area 51a where the first anode section 31 is formed and a cathode section forming area 51b where the first cathode section 41 is formed are included in the same plane.

A manufacturing method of the above described solid electrolytic capacitor is explained below. In this manufacturing method, executed are an electrode forming step of forming the anode terminal 3 and the cathode terminal 4 on the insulating substrate 5, an element mounting step of mounting the capacitor element 1 on the insulating substrate 5, a resin coating step of coating the capacitor element 1 with the enclosure resin 2, and a cutting step of cutting the insulating substrate 5 to complete the solid electrolytic capacitor, in this order.

The electrode forming step includes first to fourth steps. In the electrode forming step, the first to fourth steps are executed in this order.

Figure 3A:
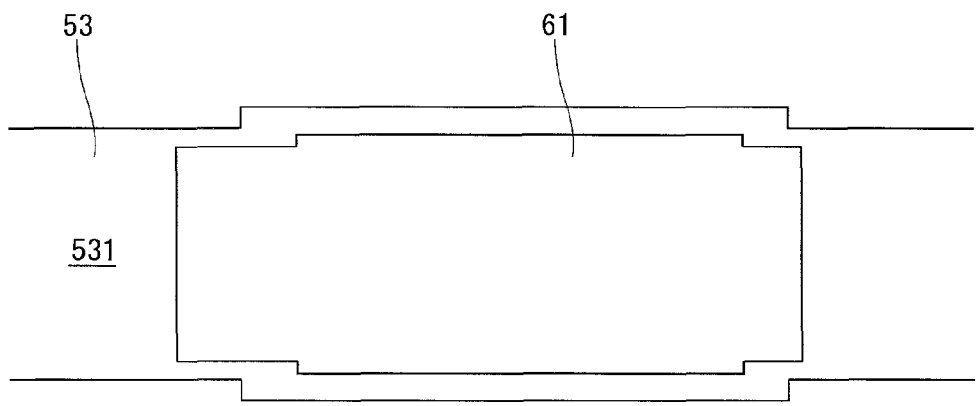
FIG. 3a is a top view for explaining a first step of an electrode forming step in a manufacturing process of the solid electrolytic capacitor.
Figure 3B:
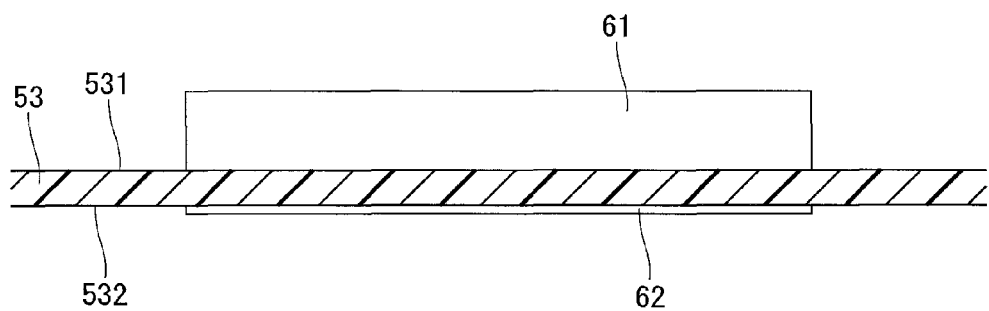
FIG. 3b is a cross-sectional view for explaining the first step.

In the first step, as shown in FIGS. 3a and 3b, one copper sheet 61 is bonded to an upper surface 531 of an insulating base 53 which is to be the insulating substrate 5 of the solid electrolytic capacitor described above and one copper sheet 62 is bonded to a lower surface 532 of the insulating base 53. As the copper sheet 61 to be bonded to the upper surface 531 of the insulating base 53, employed is a sheet having a greater thickness than the copper sheet 62 to be bonded to the lower surface 532.

Figure 4A:
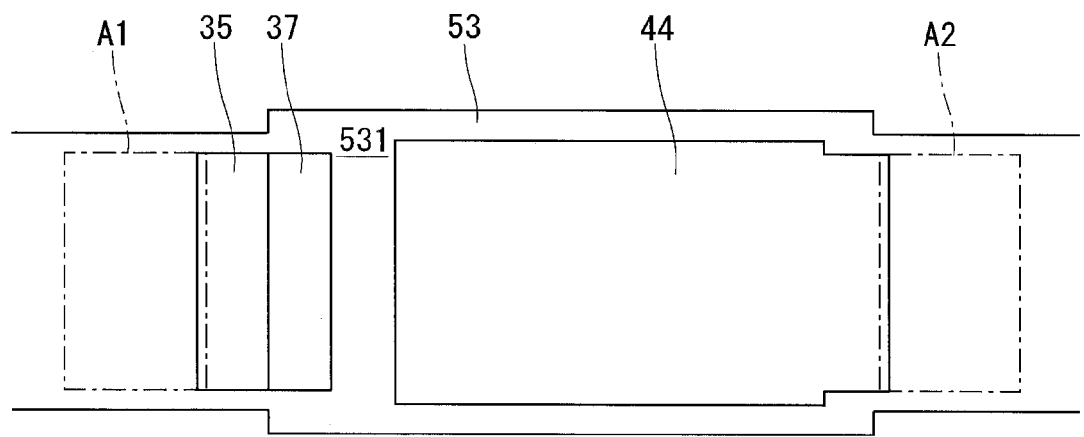
FIG. 4a is a top view for explaining a second step of the electrode forming step.
Figure 4B:
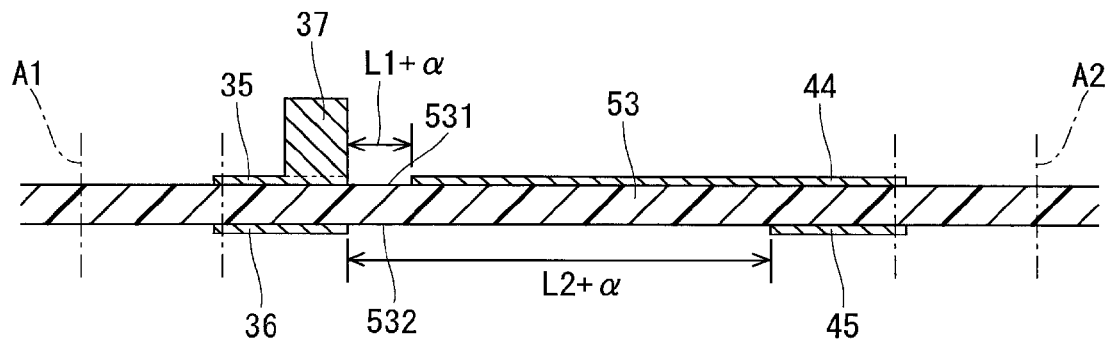
FIG. 4b is a cross-sectional view for explaining the second step.

In the second step, the copper sheet 62 bonded to the lower surface 532 of the insulating base 53 is etched to form, as shown in FIG. 4b, the second anode forming part 36 and the second cathode forming part 45 which have generally the same thicknesses at positions spaced from each other by a distance (L2+α) including the distance L2 and a distance α corresponding to thicknesses of the plating layers 38, 46 to be discussed later.

Furthermore, the copper sheet 61 bonded to the upper surface 531 of the insulating base 53 is etched to form, as shown in FIG. 4b, the first anode forming part 35 and the first cathode forming part 44 at positions spaced from each other by a distance (L1+α) including the distance L1 which is smaller than the distance L2 and the distance a corresponding to the thicknesses of the plating layers 38, 46 to be discussed later. The first anode forming part 35 has a smaller thickness than the copper sheet 61 and is provided with the connection forming part 37 projecting from the upper surface thereof. The first anode forming part 35 and the first cathode forming part 44 have generally the same thicknesses. Thus, by forming the first anode forming part 35 and the connection forming part 37 from the one copper sheet 61, the first anode forming part 35 and the connection forming part 37 are formed integrally with each other.

Figure 5A:
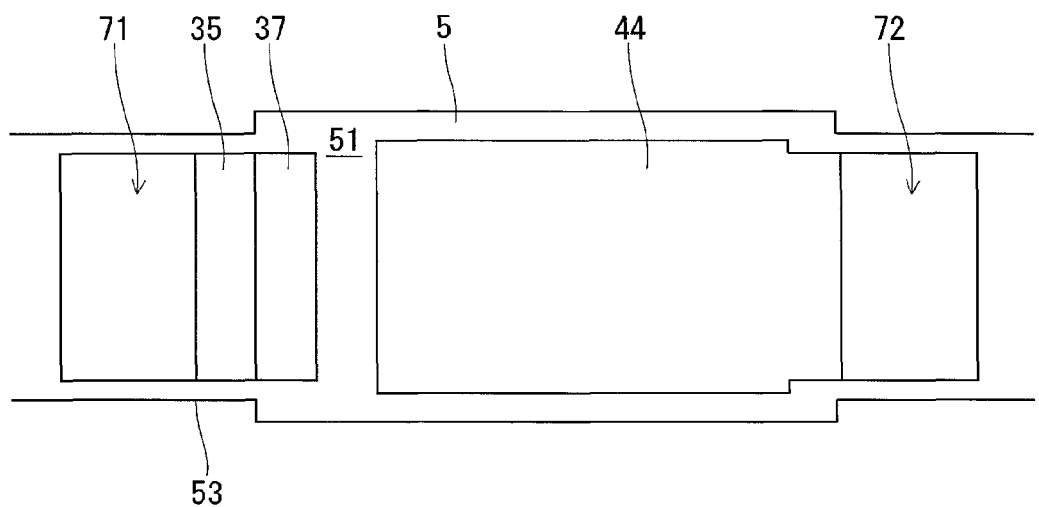
FIG. 5a is a top view for explaining a third step of the electrode forming step.
Figure 5B:
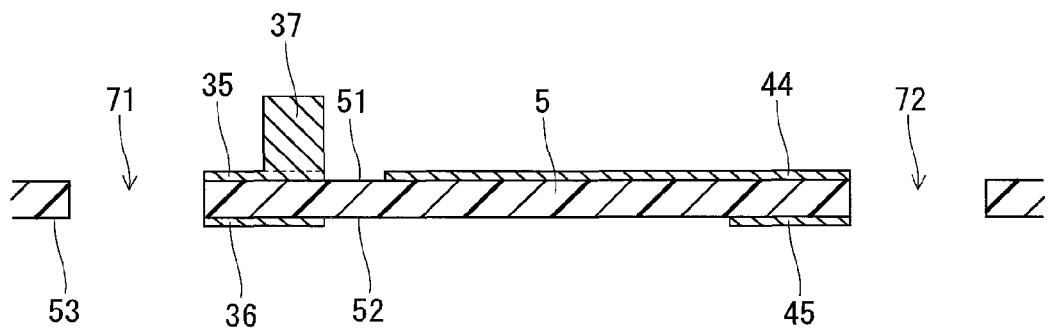
FIG. 5b is a cross-sectional view for explaining the third step.

In the third step, by punching out an area of the insulating base 53 bounded by an A1 line shown in FIG. 4a, namely an area located on the opposite side of the first anode forming part 35 to the first cathode forming part 44, formed is a through-hole 71 as shown in FIG. 5a. At this time, end parts of the first and second anode forming parts 35, 36 are punched out together with the area of the insulating base 53. Therefore, as shown in FIG. 5b, side edge surfaces of the first and second anode forming parts 35, 36 are exposed to inside of the through-hole 71.

Further, by punching out an area of the insulating base 53 bounded by an A2 Line shown in FIG. 4a, namely an area located on the opposite side of the first cathode forming part 44 to the first anode forming part 35, formed is a through-hole 72 as shown in FIG. 5a. At this time, end parts of the first and second cathode forming parts 44, 45 are punched out together with the area of the insulating base 53. Therefore, as shown in FIG. 5b, side edge surfaces of the first and second cathode forming parts 44, 45 are exposed to inside of the through-hole 72.

By forming the through-hole 71 and the through-hole 72 as described above, the insulating substrate 5 on which the capacitor element 1 should be mounted is formed by an area of the insulating base 53 between the through-hole 71 and the through-hole 72.

Figure 6A:
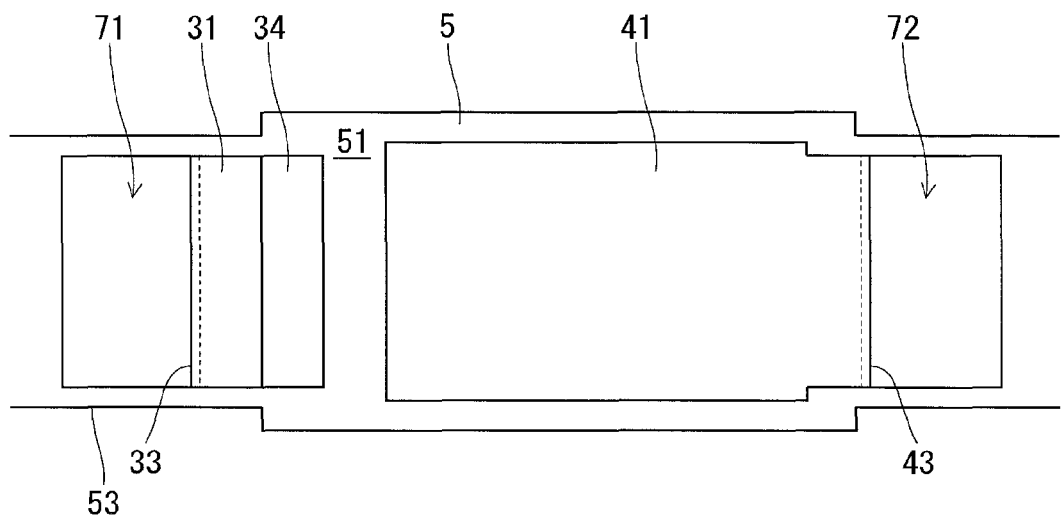
FIG. 6a is a top view for explaining a fourth step of the electrode forming step.
Figure 6B:
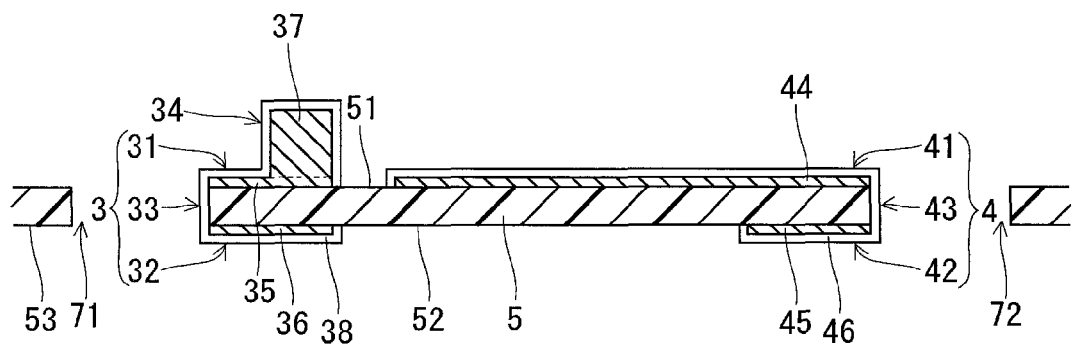
FIG. 6b is a cross-sectional view for explaining the fourth step.

In the fourth step, as shown in FIGS. 6a and 6b, plating is formed on: the outer peripheral surfaces of the first anode forming part 35 and the connection forming part 37 which are formed integrally with each other; the outer peripheral surface of the second anode forming part 36; and a part of an inner surface of the through-hole 71, to form the plating layer 38. Thus, the first anode forming part 35 and the second anode forming part 36 are electrically connected to each other by the plating layer 38, and the connection condition thereof is very good. Here, employed for the plating is a metal having high conductivity such as copper, tin or the like.

Likewise, plating is formed on the outer peripheral surfaces of the first and second cathode forming parts 44, 45 and a part of an inner surface of the through-hole 72, to form the plating layer 46. Thus, the first cathode forming part 44 and the second cathode forming part 45 are electrically connected to each other by the plating layer 46, and the connection condition thereof is very good. Here, employed for the plating is a metal having high conductivity such as copper, tin or the like.

By executing the first to fourth steps as described above, the first anode forming part 35 and a part of the plating layer 38 which is formed on the outer peripheral surface of the first anode forming part 35 form the first anode section 31 of the anode terminal 3, the second anode forming part 36 and a part of the plating layer 38 which is formed on the outer peripheral surface of the second anode forming part 36 form the second anode section 32 of the anode terminal 3, and a part of the plating layer 38 which is formed on the inner surface of the through-hole 71 (namely the side edge surface of the insulating substrate 5) forms the anode conductive layer 33 of the anode terminal 3.

Besides, the connection forming part 37 and a part of the plating layer 38 which is formed on the outer peripheral surface of the connection forming part 37 form the connection part 34.

Further, the first cathode forming part 44 and a part of the plating layer 46 which is formed on the outer peripheral surface of the first cathode forming part 44 form the first cathode section 41 of the cathode terminal 4, the second cathode forming part 45 and a part of the plating layer 46 which is formed on the outer peripheral surface of the second cathode forming part 45 form the second cathode section 42 of the cathode terminal 4, and a part of the plating layer 46 which is formed on the inner surface of the through-hole 72 (namely the side edge surface of the insulating substrate 5) forms the cathode conductive layer 43 of the cathode terminal 4.

Thus, on the insulating substrate 5, formed are the anode terminal 3 comprising the first anode section 31 and the second anode section 32 which are electrically connected to each other by the anode conductive layer 33, and the cathode terminal 4 comprising the first cathode section 41 and the second cathode section 42 which are electrically connected to each other by the cathode conductive layer 43. And, the connection part 34 is formed integrally with the first anode section 31.

Figure 7A:
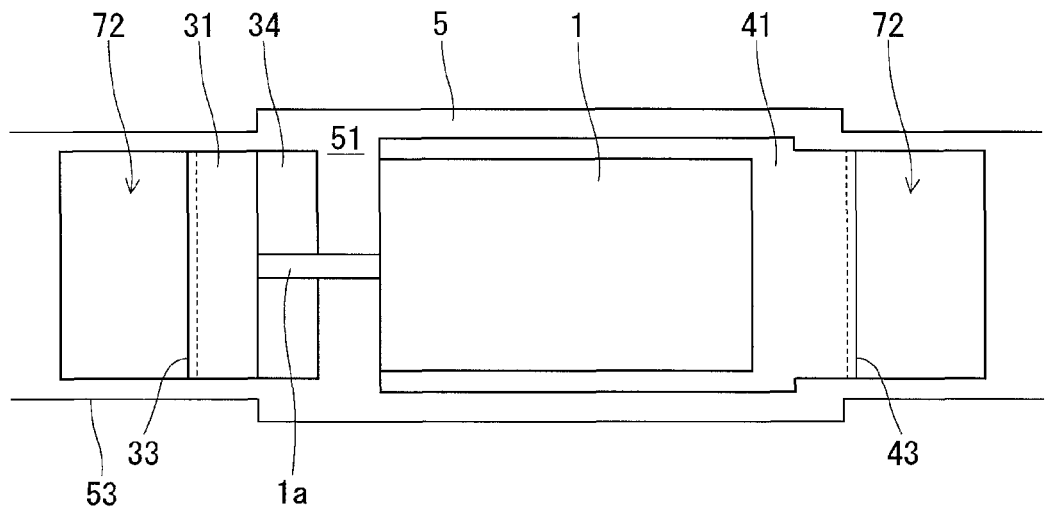
FIG. 7a is a top view for explaining an element mounting step in the manufacturing process of the solid electrolytic capacitor.
Figure 7B:
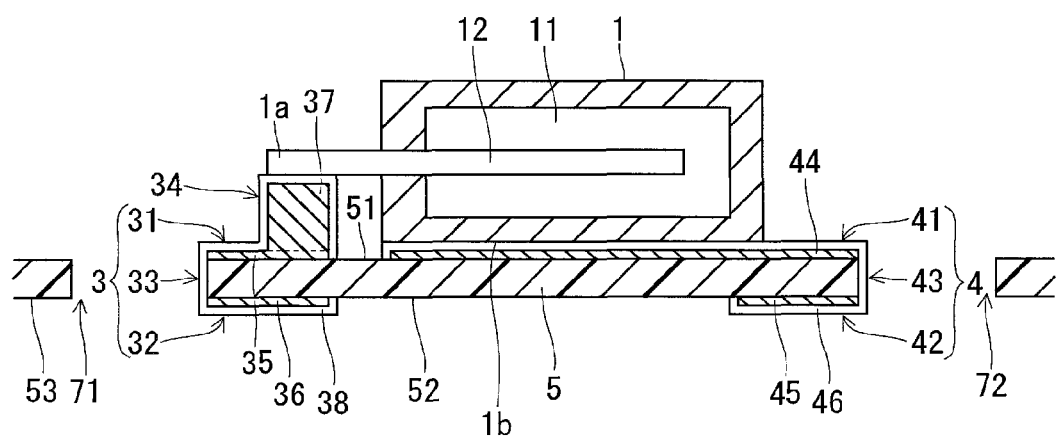
FIG. 7b is a cross-sectional view for explaining the element mounting step.

In the element mounting step, as shown in FIGS. 7a and 7b, the capacitor element 1 is mounted on the upper surface 51 of the insulating substrate 5, the anode section 1a of the capacitor element 1 is electrically connected to the end part of the connection part 34 formed integrally with the first anode section 31 by welding, and the cathode section 1b of the capacitor element 1 is electrically connected to the first cathode section 41 by the conductive adhesive.

Figure 8A:
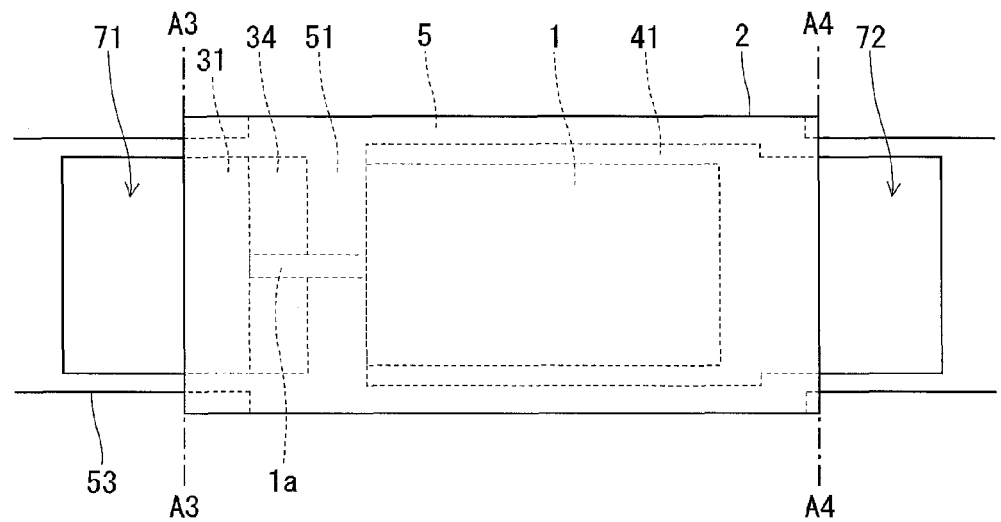
FIG. 8a is a top view for explaining a resin coating step and a cutting step in the manufacturing process of the solid electrolytic capacitor.
Figure 8B:
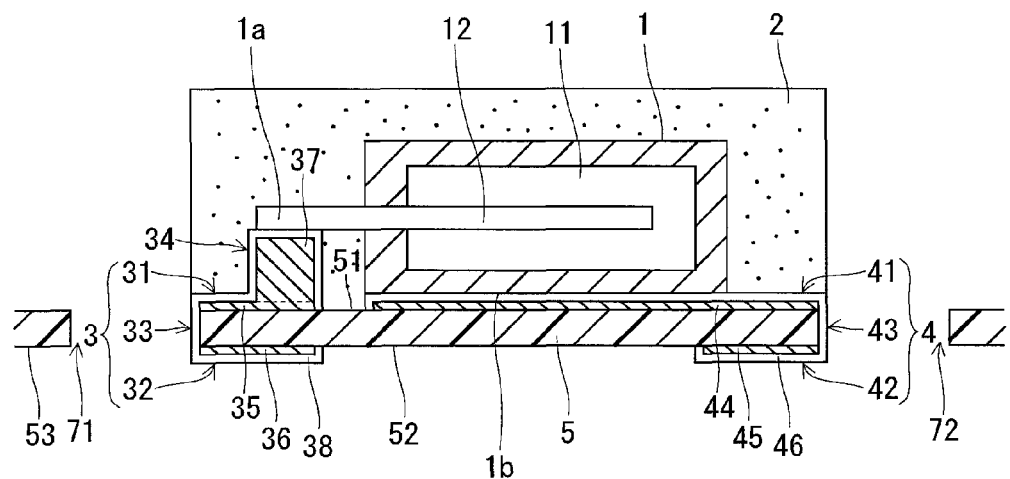
FIG. 8b is a cross-sectional view for explaining the resin coating step and the cutting step.

In the resin coating step, as shown in FIGS. 8a and 8b, the enclosure resin 2 is applied to the upper surface 51 of the insulating substrate 5 to coat the capacitor element 1 with the enclosure resin 2. At this time, the lower surface 52 of the insulating substrate 5, and the anode conductive layer 33 and the cathode conductive layer 43 formed on the side edge surface of the insulating substrate 5 are not coated with the enclosure resin 2 and maintained in an exposed state.

Therefore, the second anode section 32 and the second cathode section 42 formed on the lower surface 52 of the insulating substrate 5 are arranged so as to be exposed from the enclosure resin 2, and, the second anode section 32 and the second cathode section 42 form the lower surface electrodes. And, the anode conductive layer 33 and the cathode conductive layer 43 are exposed from the side surfaces of the enclosure resin 2.

In the cutting step, the insulating base 53 is cut along an A3-A3 line and an A4-A4 line shown in FIG. 8a. The solid electrolytic capacitor shown in FIG. 1 is thereby completed. This solid electrolytic capacitor has a structure in which the connection part 34 is formed integrally with the first anode section 31 of the anode terminal 3, and a structure in which the anode conductive layer 33 and the cathode conductive layer 43 connected respectively to the second anode section 32 and the second cathode section 42 which are to be the lower surface electrodes are exposed from the side surfaces of the enclosure resin 2.

Since a via is not formed in the insulating substrate 5 in the electrode forming step in the solid electrolytic capacitor described above, it is not necessary to execute in the manufacturing process a complicated step required in the manufacturing process of the conventional solid electrolytic capacitor, namely a step of filling a via formed in the insulating substrate 5 with a resin material in the manufacturing process of the conventional solid electrolytic capacitor. Therefore, the solid electrolytic capacitor according to this embodiment can be manufactured easily.

Figure 13:
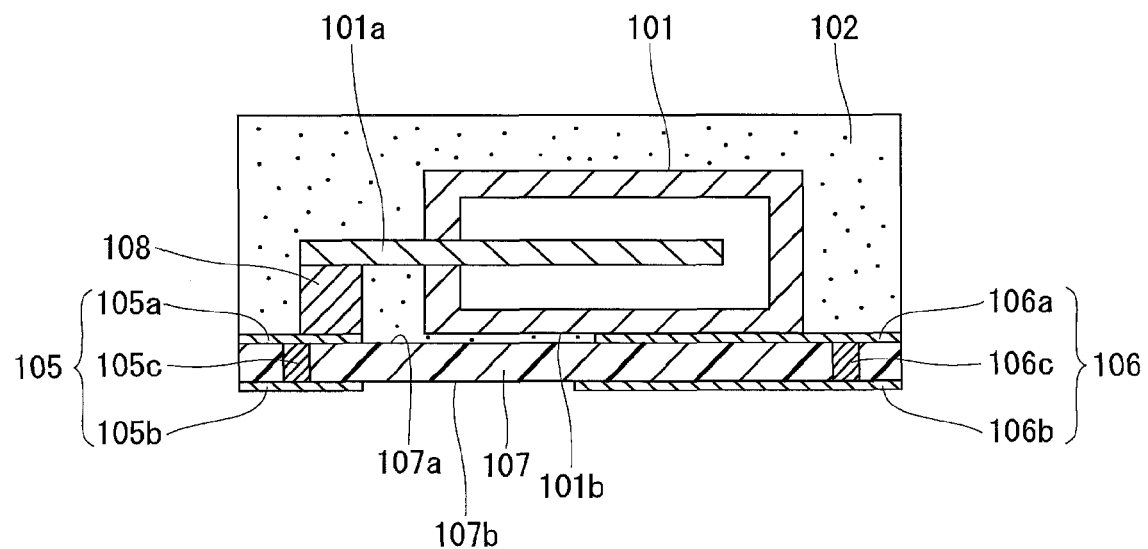
FIG. 13 is a cross-sectional view showing another conventional solid electrolytic capacitor.

Furthermore, since the connection part 34 is formed integrally with the first anode section 31 of the anode terminal 3, it is not necessary to execute a complicated step required in the manufacturing process of the conventional solid electrolytic capacitor in which the connection part 34 and the first anode section 31 are formed as separate members (cf. FIG. 13), namely a complicated step of installing the connection part 34 (pad member 108, FIG. 13) on the first anode section 31 before mounting the capacitor element 1 on the insulating substrate 5.

In the case of mounting the solid electrolytic capacitor described above on a wiring board, the lower surface electrodes including the second anode section 32 and the second cathode section 42 are soldered on a land on the wiring board.

As discussed above, the solid electrolytic capacitor described above has a structure in which the anode conductive layer 33 and the cathode conductive layer 43 connected respectively to the second anode section 32 and the second cathode section 42 which are to be the lower surface electrodes are exposed from the side surfaces of the enclosure resin 2. Therefore, solder wettability of the lower surface electrodes improves. In other words, when the lower surface electrodes are soldered on the land on the wiring board, a part of the solder can be easily provided around side edge surfaces of the lower surface electrodes. Therefore, a fillet is easily generated on the side edge surfaces of the lower surface electrodes, and as a result, the connection condition between the lower surface electrodes and the land on the wiring board is good.

As discussed above, since the solid electrolytic capacitor described above has a structure in which the connection part 34 is formed integrally with the first anode section 31 of the anode terminal 3, the connection condition between the connection part 34 and the first anode section 31 is better than that in the conventional solid electrolytic capacitor in which the connection part 34 and the first anode section 31 are formed as separate members, and the ESR or ESL of the solid electrolytic capacitor is reduced.

Further, in the solid electrolytic capacitor described above, the distance L1 between the first anode section 31 and the first cathode section 41 is smaller than the distance L2 between the second anode section 32 and the second cathode section 42. Therefore, the area of the first cathode section 41 can be increased, and therefore, a connection area between the first cathode section 41 and the cathode section 1b of the capacitor element 1 can be increased, and as a result, the ESR or ESL of the solid electrolytic capacitor is reduced.

Figure 12:
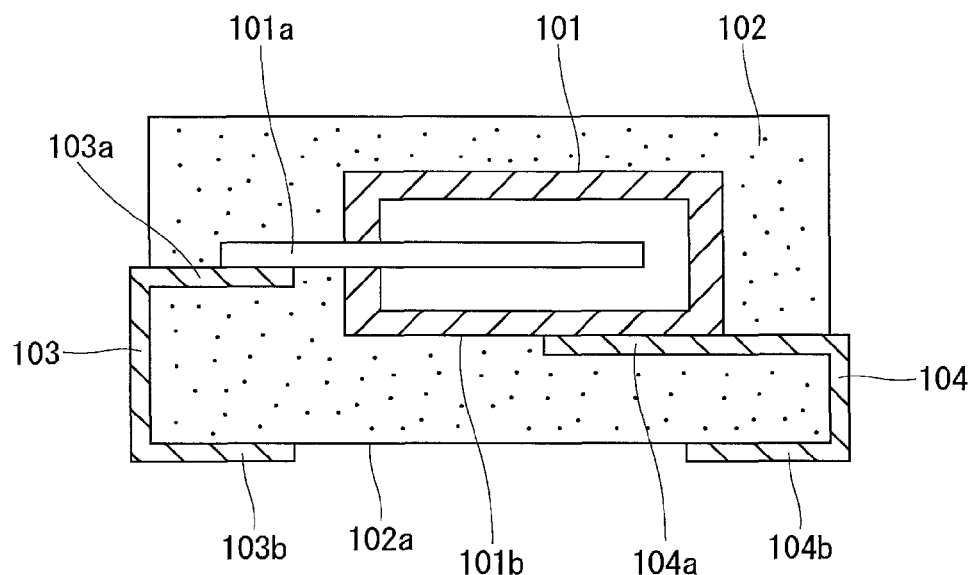
FIG. 12 is a cross-sectional view showing a conventional solid electrolytic capacitor.

The inventors of the present application compared a solid electrolytic capacitor shown in FIG. 1 and the conventional solid electrolytic capacitor shown in FIG. 12 as to the ESR and ESL by using simulation. Both the solid electrolytic capacitors have the contour having a size of 7.3 mm in length, 4.3 mm in width, and 1.8 mm in height, and the same capacitor element was used for both capacitors. A measuring frequency of the ESL was 100 MHz.

The result showed that the ESR of the solid electrolytic capacitor shown in FIG. 1 was reduced around 17% compared to the ESR of the conventional solid electrolytic capacitor shown in FIG. 12. The result also showed that the ESL of the solid electrolytic capacitor shown in FIG. 1 was reduced around 25% compared to the ESL of the conventional solid electrolytic capacitor shown in FIG. 12.

Figure 9:
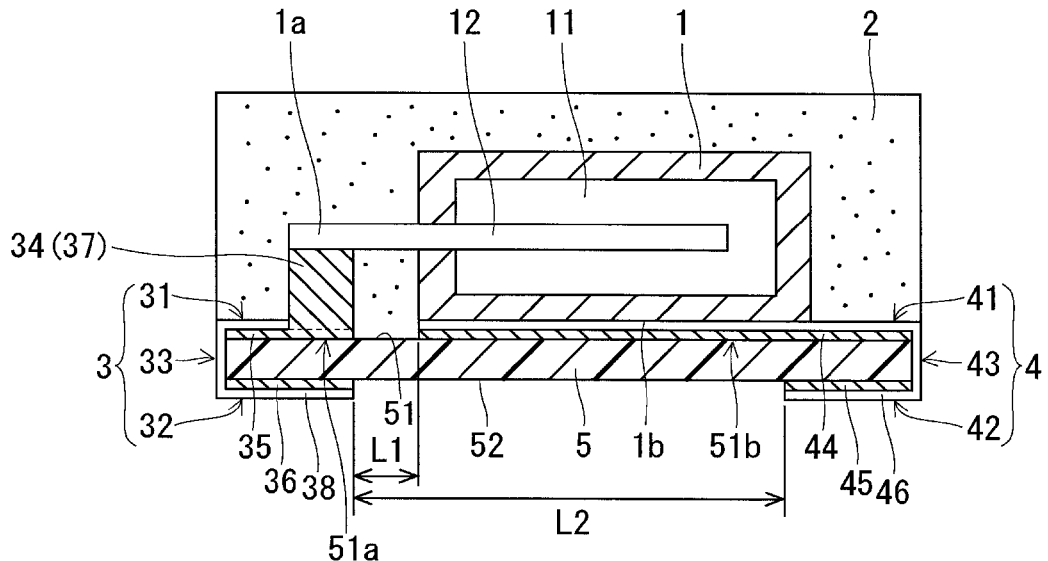
FIG. 9 is a cross-sectional view showing an example of modification of the solid electrolytic capacitor.

FIG. 9 is the cross-sectional view showing an example of modification of the solid electrolytic capacitor described above. As shown in FIG. 9, the plating layer 38 may be formed only on the outer peripheral surface of the first anode forming part 35, the outer peripheral surface of the second anode forming part 36, and the part of the side edge surface of the insulating substrate 5, without forming the plating layer 38 on the outer peripheral surface of the connection forming part 37. In the solid electrolytic capacitor according to this modification, the connection part 34 is formed by the connection forming part 37 which is not provided with the plating layer 38 on the outer peripheral surface thereof.

Therefore, in the solid electrolytic capacitor according to the modification described above, the connection condition between the connection part 34 and the anode section 1a by welding is not affected by the formation condition of the plating layer 38.

Figure 10:
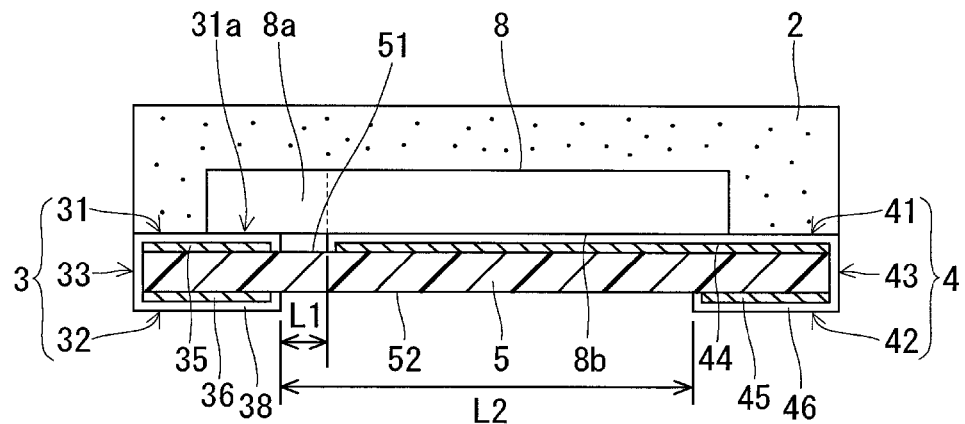
FIG. 10 is a cross-sectional view showing another example of modification of the solid electrolytic capacitor.

FIG. 10 is a cross-sectional view showing another example of modification of the solid electrolytic capacitor described above. As shown in FIG. 10, on the insulating substrate 5, a capacitor element 8 including a foil-like anode body 81 may be mounted instead of the capacitor element 1 described above.

Figure 11:
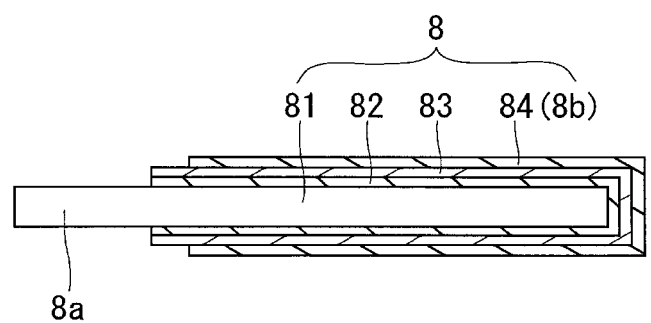
FIG. 11 is a cross-sectional view of a capacitor element included in the solid electrolytic capacitor shown in FIG. 10.

Specifically, as shown in FIG. 11, the capacitor element 8 comprises the anode body 81, a dielectric layer 82 formed on a part of an outer peripheral surface of the anode body 81, an electrolyte layer 83 formed on the dielectric layer 82, and a cathode layer 84 formed on the electrolyte layer 83.

For the anode body 81, used is a foil body made of a valve metal, on the surface of which a porous layer is formed by etching. As the valve metal, used is, for example, Aluminum, tantalum, niobium, titanium or the like.

The dielectric layer 82 is formed by an oxide film formed on the part of the outer peripheral surface of the anode body 81, and the oxide film is formed by immersing a part of the anode body 81 in the electrolyte solution such as phosphate aqueous solution, adipic acid aqueous solution or the like, to oxidize an outer peripheral surface of the part of the anode body 81 electrochemically (anodic oxidation).

The electrolyte layer 83 is formed of an electrically-conductive inorganic material such as manganese dioxide or the like, an electrically-conductive organic material such as TCNQ (Tetracyano-quinodimethane) complex salt, conductive polymer or the like, and formed on the dielectric layer 82.

The cathode layer 84 is formed by a carbon layer formed on the electrolyte layer 83 and a silver paste layer formed on the carbon layer, and the electrolyte layer 83 and the cathode layer 84 are electrically connected to each other.

In the capacitor element 8 described above, an exposed portion of the outer peripheral surface of the anode body 81 which is not covered by the dielectric layer 82 forms an anode section 8a of the capacitor element 8, and the cathode layer 84 forms a cathode section 8b of the capacitor element 8.

In the solid electrolytic capacitor according to the modification, the anode section 8a of the capacitor element 8 is electrically connected to a partial area 31a of the upper surface of the first anode section 31 by welding. Therefore, the partial area 31a of the upper surface of the first anode section 31 forms a connection part for electrically connecting the first anode section 31 and the anode section 8a of the capacitor element 8 to each other. The connection part is formed integrally with the first anode section 31.

The cathode section 8b of the capacitor element 8 is electrically connected to the first cathode section 41 by the conductive adhesive in a similar manner to the solid electrolytic capacitor shown in FIG. 1.

Also in the solid electrolytic capacitor according to the modification described above, it is not necessary to execute the complicated step required in the manufacturing process of the conventional solid electrolytic capacitor in a similar manner to the solid electrolytic capacitor shown in FIG. 1. Further, the solder wettability of the lower surface electrodes improves better than in the conventional solid electrolytic capacitor, and a fillet is easily generated on the side edge surfaces of the lower surface electrodes, and as a result, the connection condition between the lower surface electrodes and the land on the wiring board is good. Further, the ESR or ESL of the solid electrolytic capacitor is reduced more than in the conventional solid electrolytic capacitor.

Furthermore, also in the solid electrolytic capacitor according to the modification described above, since the distance L1 between the first anode section 31 and the first cathode section 41 is smaller than the distance L2 between the second anode section 32 and the second cathode section 42 as shown in FIG. 10, the area of the first cathode section 41 can be increased. Therefore, the connection area between the first cathode section 41 and the cathode section 8b of the capacitor element 8 can be increased, and as a result, the ESR or ESL of the solid electrolytic capacitor is reduced.

The present invention is not limited to the foregoing embodiment in construction but can be modified variously within the technical range set forth in the appended claims. In the embodiment described above, copper is used as the material of the first and second anode forming parts 35, 36 which form the anode terminal 3, and the material of the first and second cathode forming parts 44, 45 which form the cathode terminal 4. However, this invention is not limited to this, and various electrically conductive materials can be used as said materials.

Further, the position and shape of the connection part 34 is not limited to those shown in FIG. 1, and various positions and shapes of the connection part 34 may be employed.

Furthermore, in the above described embodiment, the one copper sheet 62 is etched to form the second anode forming part 36 forming the second anode section 32 and the second cathode forming part 45 forming the second cathode section 42 in the second step (cf. FIG. 4b), but the present invention is not limited to this. For example, it is also possible to prepare a copper sheet which is to be the second anode forming part 36 and a copper sheet which is to be the second cathode forming part 45 separately to bond them at the positions spaced from each other by the distance (L2+α).

What is claimed is:

1. A solid electrolytic capacitor comprising:
   a capacitor element including an anode section, a cathode section, and a dielectric layer; and
   an insulating substrate in which an anode terminal and a cathode terminal are formed,
   the capacitor element being mounted on the insulating substrate,
   wherein the anode terminal comprises a first anode section formed on a first surface of the insulating substrate on which the capacitor element is mounted, and a second anode section formed on a second surface of the insulating substrate located on an opposite side to the first surface, which are electrically connected to each other, a connection part configured to electrically connect the first anode section and the anode section of the capacitor element to each other is formed integrally with the first anode section, the cathode terminal comprises a first cathode section formed on the first surface of the insulating substrate and a second cathode section formed on the second surface of the insulating substrate, which are electrically connected to each other, a distance between the first anode section and the first cathode section is smaller than a distance between the second anode section and the second cathode section, and, the anode section and the cathode section of the capacitor element are electrically connected to the connection part and the first cathode section respectively.

2. The solid electrolytic capacitor according to claim 1, wherein on the first surface of the insulating substrate, an anode section forming area where the first anode section is formed and a cathode section forming area where the first cathode section is formed are included in the same plane.

3. The solid electrolytic capacitor according to claim 1, wherein an end of the cathode section of the capacitor element and an end of the first cathode section of the cathode terminal which are located on the first anode section side are generally flush with each other at a position spaced from the first anode section by a predetermined distance.

4. The solid electrolytic capacitor according to claim 1, wherein the capacitor element includes an anode body from which an anode lead is drawn out, the dielectric layer is formed on an outer peripheral surface of the anode body, a cathode layer is formed on an electrolyte layer which is formed on the dielectric layer, the anode lead and the cathode layer form the anode section and the cathode section of the capacitor element respectively, the connection part projects on the first anode section, and the anode section of the capacitor element is connected to an end part of the connection part.

5. The solid electrolytic capacitor according to claim 1, wherein the capacitor element includes a foil-like anode body, the dielectric layer is formed on a part of an outer peripheral surface of the anode body, a cathode layer is formed on an electrolyte layer which is formed on the dielectric layer, a part of the outer peripheral surface of the anode body which is exposed from the dielectric layer and the cathode layer form the anode section and the cathode section of the capacitor element respectively, and the connection part is formed by a part of an outer peripheral surface of the first anode section.

* * * * *